UNITED STATES PATENT OFFICE.

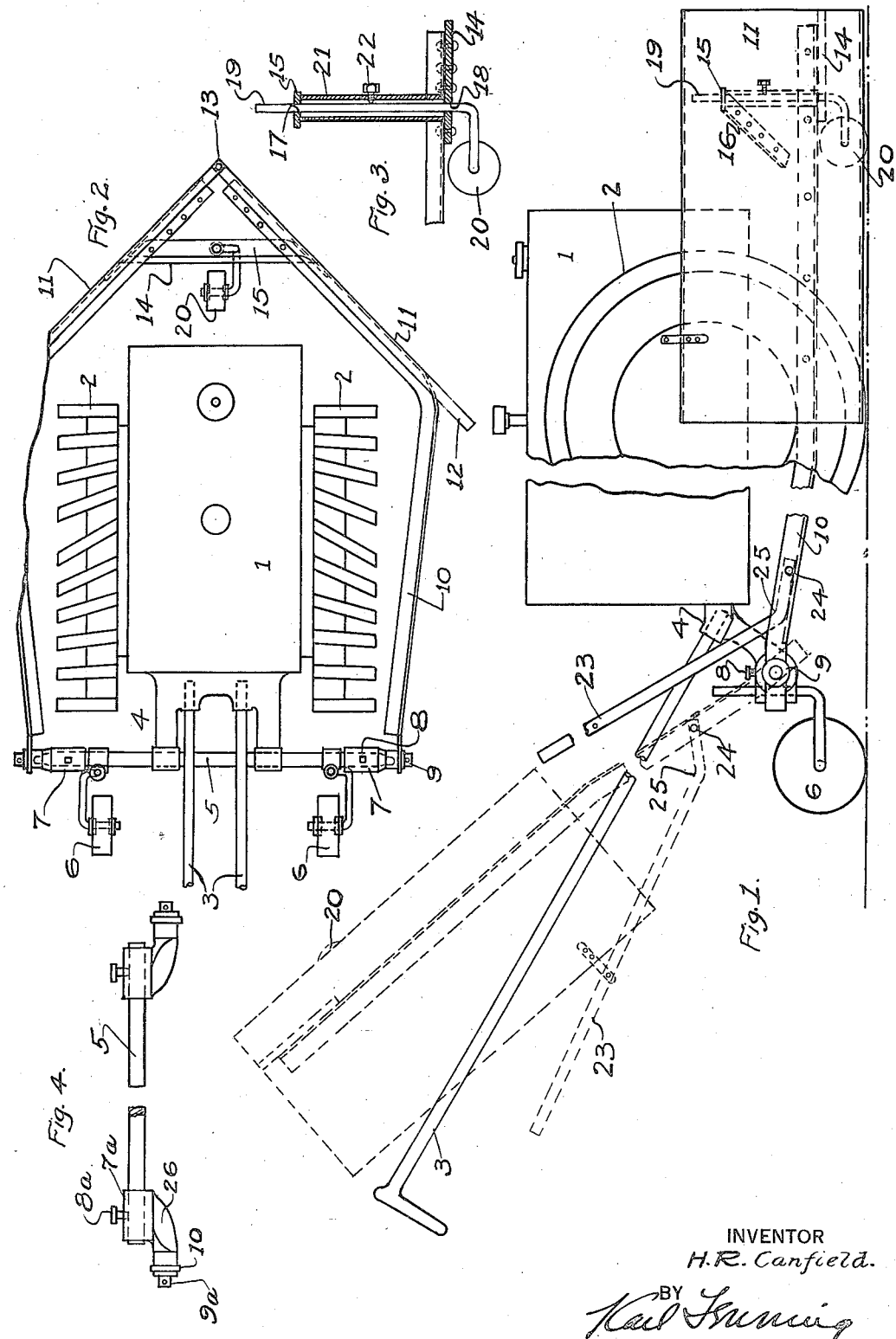

HARRY R. CANFIELD, OF CLEVELAND, OHIO.

SNOWPLOW.

1,424,878. Specification of Letters Patent. Patented Aug. 8, 1922.

Application filed February 9, 1920. Serial No. 357,284.

*To all whom it may concern:*

Be it known that I, HARRY R. CANFIELD, a citizen of the United States, residing at Cleveland, in the State of Ohio, have invented certain new and useful Improvements in Snowplows, of which the following is a specification.

While not confined thereto the present invention is particularly adapted for use in connection with tractors. Such machines generally are provided with a draft rigging or hitch mechanism at the rear.

The present invention contemplates a device which may be attached to the draft rigging at the rear of the tractor but which may extend forward to remove the snow in front of the tractor and which may be turned back over the tractor to rest thereupon when it is desired to move the device from place to place without causing the snow plow to function.

In one specific form the invention contemplates a snow plow particularly adapted for use with small tractors of the type generally provided with handles or steering bars extending a distance from the rear of the tractor and with a transverse draft bar at the rear of the tractor. In this form the invention includes means applied to the draft bar adapted to receive forwardly extending bars which preferably are inclined toward each other forward of the tractor. To the inclined ends are attached the side plates of the plow. Transverse braces are connected to the side plates of the plow and to the forwardly extending bars. An adjustable caster wheel may be mounted between the side plates so as to support the plow and facilitate its operation and transportation. A handle may also be provided for lifting the plow to pass over obstacles or for other purposes as well as to turn the plow back over the tractor to rest upon the handle bars.

In the accompanying drawing is shown one form the invention may take. Figure 1 is a side elevation of the plow attached to a tractor with the plow shown on the handle bars in dotted lines; Fig. 2 is a plan view of the plow applied to a tractor; Fig. 3 is a detailed view of the supporting means for the caster wheel of the plow; and Fig. 4 is a rear elevation of a draw bar of a tractor fitted with an optional arrangement for attaching the plow.

I have shown in a diagrammatic way the tractor as having a body 1 supported on the tractor wheels 2 and having rearwardly extending handle bars 3 in the present instance mounted on a yoke 4. Extending rearwardly from the tractor is a transverse draw bar 5 on which are mounted supplemental wheels 6 to support the tractor. At each end of the draw bar 5 I provide a casting 7 held in place by a set screw 8 and having a projecting bearing 9 on which may be mounted the angle bars 10 which support the plow. Each angle bar 10 in the present instance extends forward from its bearing 9 and is inclined downwardly for a part of its length. As the bars 10 leave the bearings 9 they are inclined outwardly so as to afford abundant clearance—for the tractor wheels. Toward the forward ends of the tractor proper the angle bars 10 are bent inwardly so as to approach each other. A sheet of metal is bent at an angle and the two wings so formed are attached by any suitable means to the forward ends of the angle bars 10 in such a way as to form sides 11 for the snow plow. The sheet and consequently the plow sides 11 have at top and bottom inturned reinforcing ribs 12 extending throughout the length of the sides. Before the sheet is bent the ribs are cut at the line of the bending and consequently in the plow the ends of the ribs 12 overlie each other at the point of the plow 13 at which point they may be riveted or otherwise connected together so as to add to the rigidity of the structure. Within the point or angle of the plow and extending from side to side and riveted to the forward ends of the angle bars 10 is a gusset plate 14 which acts as a brace for the structure. A strap of metal 15 is arranged across the inside of the plow above the gusset plate, its ends 16 being turned downwardly and attached to the sides of the plow. This forms a sturdy thoroughly braced structure which will efficiently operate to remove the snow and will not come in contact with any of the operative parts of the tractor.

As more clearly shown in Fig. 3 a hole 17 is provided in the trap 15 registering with a corresponding hole 18 in the gusset 14 through which passes a vertical shaft 19 carrying on its lower end a caster wheel 20 which may extend more or less below the bottom edge of the sides of the plow so as to support the plow and keep it from making actual contact with the ground. The shaft 19 is surrounded by a tube 21 which extends from the gusset plate 14 to the strap 15 and is provided with a set screw 22. This arrangement makes it possible to withdraw the wheel so that the plow may rest entirely upon the ground or to adjust the wheel further down so as to support the plow and hold it at a suitable distance from the ground. The set screw makes it possible to hold the wheel as so adjusted. The tube 21 is not rigidly connected to either the gusset 14 or the strap 15 and it consequently does not interfere with the oscillation or rotation of the shaft 19 of the caster wheel 20.

There is shown a handle 23 for the plow pivoted at 24 to the inner side of one of the angle bars 10 in the rear of the plow sides. The handle 23 is bent at 25 so that the portion between the pivot 24 and the bend 25 may rest against the lower web of the angle bar 10 while the grip portion of the handle 23 extends upwardly in position to be grasped by the operator. It will be seen that a rearward pull on the handle 23 will cause the forward ends of the angle bars 10 carrying the plow sides to be raised. This arrangement enables the plow to be elevated and passed over irregularities or obstructions on the ground. By means of the handle 23, or in any other way, the plow may be lifted and turned on the bearings 9 as pivots to the dotted position shown in Fig. 1 in which the plow rests upon the handle bars 3 of the tractor. This is a convenient and desirable position for transporting the plow from place to place when it is not desired to operate it as a plow.

The castings 7 fit over the ends of the draw bar 5 and their bearings 9 extend outwardly therefrom. In assembling the apparatus it is therefore necessary to spring the angle bars 10 apart sufficiently to allow them to be seated on the bearings 9 or to allow the castings 7 to be seated on the draw bar.

In Fig. 4 I have shown an optional arrangement to avoid the necessity of springing the angle bars apart in assembling. In this arrangement clamps 7ª are mounted on the draw bar 5 and held in position by set screws 8ª. The bearings 9ª for the angle bars 10 are carried by off-sets 26 carried by the clamps 7ª. In this arrangement the draw bar 5 extends entirely through the clamps 7ª so that in assembling the apparatus one of the clamps 7ª may be attached in position at the end of the draw bar and the other clamp 7ª may be put upon the draw bar. One of the angle bars 10 may be now placed in position upon the fixed clamp 7ª and the loose clamp 7ª may be moved and attached so as to properly engage the other angle bar 10 after which it may be fixed in its position by means of the set screw 8ª. If it be desirable to mount the plow on the draw bar without having to disconnect the bearings 9ª from the angle bars 10, one clamp 7ª may be put upon one end of the draw bar and moved toward the other end until the other clamp can be put on; then both clamps may be moved back along the draw bar to symmetrical positions.

The details of the structure here shown are illustrative only and are not to be taken as limiting the present invention.

I claim as my invention:

1. A tractor, a snow plow propelled thereby, a horizontal transverse pivot for the plow on the tractor on which the plow may turn to pass over ground obstacles, and a handle to turn the plow on the pivot.

2. A tractor, a snow plow propelled thereby, a horizontal transverse pivot for the plow on the tractor on which the plow may turn, means to support the plow on one side of the pivot when operative, and means to support the plow on the other side of the pivot when not operative.

3. A tractor, traction wheels on the tractor, a draft rigging to the rear of the traction wheels, and a snow plow propelled in front of the tractor and pivoted to the draft rigging on a transverse horizontal axis.

4. A tractor, a snow plow propelled thereby, and a horizontal transverse pivot for the plow on the tractor on which the plow may turn to pass over ground obstacles or turn until its center of gravity passes over the pivot to permit the plow to rest back upon the tractor.

5. A tractor, a ground wheel therefor having a vertical axis of oscillation, a rearwardly extending steering means on the tractor terminating in a steering handle for oscillating the ground wheel to steer the tractor, a snow plow in front of the tractor and propelled thereby, a horizontal pivot for the snow plow on the tractor, means including a plow handle adjacent the steering handle for turning the plow on the pivot.

6. A tractor, rearwardly extending steering bars on the tractor, a draft rigging on the rear of the tractor, and a snow plow propelled in front of the tractor and pivoted to the draft rigging on a transverse horizontal axis.

7. A tractor, rearwardly extending steering bars on the tractor, a draft rigging on the rear of the tractor, a snow plow propelled in front of the tractor, and means to turn the plow on the draft rigging as a transverse horizontal axis.

8. A tractor, rearwardly extending steering bars on the tractor, a draft rigging on the rear of the tractor, a snow plow propelled in front of the tractor, means to turn the plow on the draft rigging as a transverse horizontal axis, and a caster wheel to support the plow.

9. A tractor, traction wheels on the tractor, a member extending rearwardly of the traction wheels, and a snow plow propelled in front of the tractor and pivoted on a transverse horizontal axis and adapted to rest on the rearwardly extending member when not in use.

10. A snow plow comprising supporting bars bent to approach each other at their forward ends, plow sides attached to the approaching ends of the bars, a gusset provided with a hole and within the sides and attached to the bars; a brace between the sides above the gusset and provided with a hole, a vertical tube registering with the holes and revolvably held between the gusset and brace, a vertical shaft through the holes and the tube, a wheel on the shaft to support the plow, and means to adjust the wheel.

11. A tractor, rearwardly extending steering means on the tractor, a snow plow propelled in front of the tractor, and a handle for the snow plow adjacent the steering means.

12. A tractor, traction wheels on the tractor, a draft rigging to the rear of the traction wheels, a snow plow propelled in front of the tractor and pivoted to the draft rigging on a transverse horizontal axis, and means for turning the plow on its axis.

13. A snow plow comprising supporting bars bent to approach each other at their forward ends, plow sides attached to the approaching ends of the bars, a gusset provided with a hole and within the sides and attached to the bars, a brace between the sides above the gusset and provided with a hole, a vertical tube registering with the holes and revolvably held between the gusset and brace, a vertical shaft through the holes and the tube, a set screw to hold the shaft at a fixed height in the tube, and a wheel on the shaft to support the plow.

HARRY R. CANFIELD.